United States Patent
Suh et al.

(10) Patent No.: US 11,139,477 B2
(45) Date of Patent: Oct. 5, 2021

(54) BINDER COMPOSITION FOR LITHIUM SECONDARY BATTERY AND LITHIUM SECONDARY BATTERY INCLUDING THE SAME

(71) Applicant: SAMSUNG SDI CO., LTD., Yongin-si (KR)

(72) Inventors: Soonsung Suh, Yongin-si (KR); Seunguk Kwon, Yongin-si (KR); Nam Seon Kim, Daejeon (KR); Soo Jung Kim, Daejeon (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 290 days.

(21) Appl. No.: 16/277,183

(22) Filed: Feb. 15, 2019

(65) Prior Publication Data

US 2019/0260029 A1    Aug. 22, 2019

(30) Foreign Application Priority Data

Feb. 20, 2018 (KR) .................. 10-2018-0019921

(51) Int. Cl.
| | |
|---|---|
| *H01M 4/62* | (2006.01) |
| *H01M 4/583* | (2010.01) |
| *H01M 4/38* | (2006.01) |
| *H01M 4/133* | (2010.01) |
| *H01M 10/0525* | (2010.01) |
| *C08L 33/02* | (2006.01) |
| *C08L 33/24* | (2006.01) |
| *C09J 133/00* | (2006.01) |
| *H01M 4/02* | (2006.01) |
| *C08L 1/02* | (2006.01) |
| *C08L 5/00* | (2006.01) |

(52) U.S. Cl.
CPC ............ *H01M 4/622* (2013.01); *C08L 33/02* (2013.01); *C08L 33/24* (2013.01); *C09J 133/00* (2013.01); *H01M 4/133* (2013.01); *H01M 4/386* (2013.01); *H01M 4/583* (2013.01); *H01M 10/0525* (2013.01); *C08L 1/02* (2013.01); *C08L 5/00* (2013.01); *C08L 2203/20* (2013.01); *H01M 2004/027* (2013.01); *H01M 2004/028* (2013.01)

(58) Field of Classification Search
CPC ....... H01M 10/0525; H01M 2004/027; H01M 2004/028; H01M 4/133; H01M 4/386; H01M 4/48; H01M 4/583; H01M 4/587; H01M 4/622; H01M 4/625
See application file for complete search history.

(56) References Cited

U.S. PATENT DOCUMENTS

| | | |
|---|---|---|
| 8,785,049 B2 | 7/2014 | Kim et al. |
| 2014/0186680 A1 | 7/2014 | Kim et al. |
| 2016/0036056 A1 | 2/2016 | Kim et al. |
| 2017/0077497 A1 | 3/2017 | Ogata |

FOREIGN PATENT DOCUMENTS

| | | | |
|---|---|---|---|
| JP | 10-121272 A | | 5/1998 |
| JP | 10121272 A | * | 5/1998 |
| JP | 2008-285640 A | | 11/2008 |
| JP | 2013-110108 A | | 6/2013 |
| KR | 10-1126202 B1 | | 3/2012 |
| KR | 10-1453785 B1 | | 10/2014 |
| KR | 10-2016-0016047 A | | 2/2016 |
| KR | 10-2017-0033123 A | | 3/2017 |
| WO | WO 2013-147007 A1 | | 10/2013 |

OTHER PUBLICATIONS

Korean Office action dated Sep. 29, 2020.
Korean Notice of Allowance dated Jun. 25, 2021.

* cited by examiner

*Primary Examiner* — Carlos Barcena
(74) *Attorney, Agent, or Firm* — Lee IP Law, P.C.

(57) ABSTRACT

A binder composition for a lithium secondary battery and a lithium secondary battery including the binder, the binder composition including a copolymer that includes a first structure unit including amide, a second structural unit including carboxylic acid or a salt thereof, and a third structural unit including a morpholine ring or a thiomorpholine ring.

15 Claims, 1 Drawing Sheet

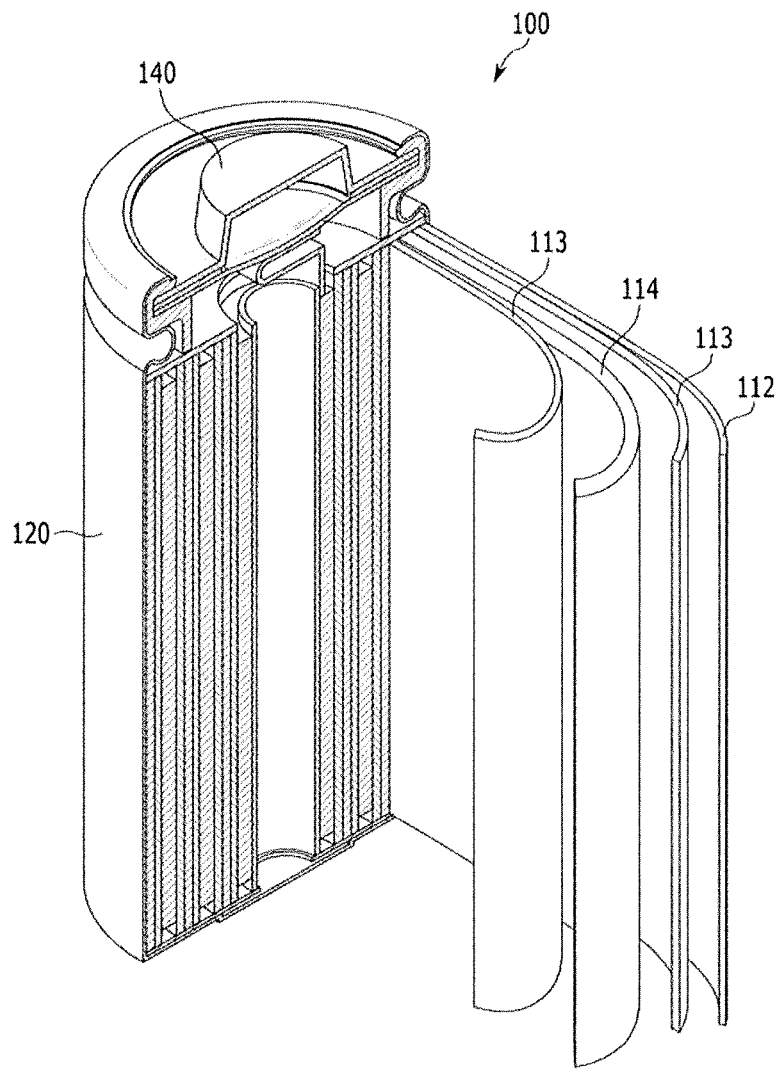

BINDER COMPOSITION FOR LITHIUM SECONDARY BATTERY AND LITHIUM SECONDARY BATTERY INCLUDING THE SAME

CROSS-REFERENCE TO RELATED APPLICATION

Korean Patent Application No. 10-2018-0019921, filed on Feb. 20, 2018, in the Korean Intellectual Property Office, and entitled: "Binder Composition for Lithium Secondary Battery and Lithium Secondary Battery Including the Same," is incorporated by reference herein in its entirety.

BACKGROUND

1. Field

Embodiments relate to a binder composition for a lithium secondary battery and a lithium secondary battery including the same.

2. Description of the Related Art

A lithium secondary battery includes positive and negative electrodes including a material that can reversibly intercalate/deintercalate lithium ions as positive and negative active materials and an organic electrolytic solution or a polymer electrolytic solution charged between the positive and negative electrodes. Herein, the positive and negative electrodes intercalate and deintercalate lithium ions and produce electrical energy through oxidation and reduction reactions.

As for a positive active material for a lithium secondary battery, a lithium-transition metal oxide being capable of intercalating lithium such as $LiCoO_2$, $LiMn_2O_4$, $LiNi_{1-x}Co_xO_2$ ($0<x<1$), and the like has been used.

As for a negative active material for a lithium secondary battery, various carbon materials such as artificial graphite, natural graphite, and hard carbon capable of intercalating and deintercalating lithium ions have been used. Demands of a battery having high energy density increasingly have required a negative active material having high theoretical capacity density. Accordingly, Si, Sn, and Ge alloyed with lithium and an oxide thereof and an alloy thereof have drawn attention.

SUMMARY

The embodiments may be realized by providing a binder composition for a lithium secondary battery including a copolymer that includes a first structure unit including amide, a second structural unit including carboxylic acid or a salt thereof, and a third structural unit including a morpholine ring or a thiomorpholine ring.

The first structural unit may be represented by Chemical Formula 1:

[Chemical Formula 1]

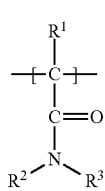

wherein, in Chemical Formula 1, $R^1$ to $R^3$ may each independently be hydrogen, a substituted or unsubstituted C1 to C10 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, or a substituted or unsubstituted C1 to C30 heteroaryl group.

The second structural unit may be represented by Chemical Formula 2:

[Chemical Formula 2]

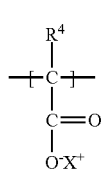

wherein, in Chemical Formula 2, $R^4$ may be hydrogen, a substituted or unsubstituted C1 to C10 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, or a substituted or unsubstituted C1 to C30 heteroaryl group, and X may be hydrogen, deuterium, or an alkali metal.

The third structural unit may be represented by Chemical Formula 3:

[Chemical Formula 3]

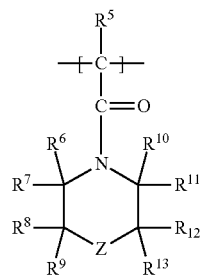

wherein, in Chemical Formula 3, $R^5$ to $R^{13}$ may each independently be hydrogen, a substituted or unsubstituted C1 to C10 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, or a substituted or unsubstituted C1 to C30 heteroaryl group, and Z may be 0, S, S(=O), or $S(=O)_2$.

The copolymer may include about 20 wt % to about 68 wt % of the first structural unit, about 30 wt % to about 70 wt % of the second structural unit, and about 2 wt % to about 10 wt % of the third structural unit, all wt % being based on a total weight of the copolymer.

The binder composition may further include a cyclic compound.

The cyclic compound may include a cellulose compound, chitosan, alginate, or pullulan.

A weight ratio of the copolymer to the cyclic compound may be about 1:9 to about 5:5.

A weight average molecular weight of the copolymer may be about 400,000 to about 1,000,000.

A pH of the binder composition may be about 6.0 to about 11.5.

The embodiments may be realized by providing a lithium secondary battery including an electrode that includes the binder composition for a lithium secondary battery according to an embodiment and an electrode active material; a separator; and an electrolyte.

The electrode active material may include Si, $SiO_x$, a Si—C composite, a Si-containing alloy, a carbon compound, or a combination thereof.

The electrode active material may include the Si, $SiO_x$, a Si—C composite, or Si-containing alloy, and the Si, $SiO_x$, a Si—C composite, or Si-containing alloy may be included in an amount of about 5 wt % to about 50 wt %, based on a total weight of the electrode active material.

The electrode active material may include the carbon compound, and the carbon compound may include crystalline carbon including non-shaped, sheet, flake, spherical, or fiber-shaped natural graphite, artificial graphite, amorphous carbon of soft carbon, hard carbon, a mesophase pitch carbonized product, fired coke, or a combination thereof.

The electrode active material may include the carbon compound, and the carbon compound may be included in an amount of about 50 wt % to about 95 wt %, based on a total weight of the electrode active material.

BRIEF DESCRIPTION OF THE DRAWING

Features will be apparent to those of skill in the art by describing in detail exemplary embodiments with reference to the attached drawing in which:

The FIGURE illustrates a schematic view of a lithium secondary battery according to an embodiment.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing FIGURES, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, when a definition is not otherwise provided. "substituted" may refer to replacement of a hydrogen atom of a compound by a C1 to C30 alkyl group; a C2 to C30 alkenyl group, a C2 to C30 alkynyl group, a C3 to C30 cycloalkyl group; a C6 to C30 aryl group; a C1 to C30 heteroaryl group; a C1 to C10 alkoxy group; a silyl group; a C1 to C30 alkylsilyl group; a C1 to C10 alkoxysilyl group; an amine group; a C1 to C30 alkylamine group; an arylamine group; or a halogen.

As used herein, when a definition is not otherwise provided, "hetero" may refer to inclusion of atoms selected from N, O, S, and P.

As used herein, when a definition is not otherwise provided, "alkyl group" may refer to "a saturated alkyl group" without a double bond or a triple bond; or "an unsaturated alkyl group" such as an alkenyl group or an alkynyl group including at least one double bond or triple bond. The "alkenyl group" may refer to a substituent including at least two carbon atoms forming at least one carbon-carbon double bond and the "alkynyl group" may refer to a substituent including at least two carbon atoms forming at least one carbon-carbon triple bond. The alkyl group may be a branched, linear, or cyclic alkyl group.

The alkyl group may be a C1 to C30 alkyl group, specifically a C1 to C6 lower alkyl group, a C7 to C10 medium-sized alkyl group, or a C11 to C30 higher alkyl group.

For example, a C1 to C4 alkyl group may have 1 to 4 carbon atoms in alkyl chain and may be selected from methyl, ethyl, propyl, iso-propyl, n-butyl, iso-butyl, sec-butyl, and t-butyl.

Examples of the alkyl group may be a methyl group, an ethyl group, a propyl group, an isopropyl group, a butyl group, an isobutyl group, a t-butyl group, a pentyl group, a hexyl group, an ethenyl group, a propenyl group, a butenyl group, a cyclopropyl group, a cyclobutyl group, a cyclopentyl group, a cyclohexyl group, and the like.

"Aryl group" may refer to a monocyclic or fused ring (polycyclic), e.g., a plurality of cyclic substituents sharing adjacent pairs of carbon atoms.

"Heteroaryl group" may refer to an aryl group including a hetero atom selected from N, O, S, and P. In an implementation, when the heteroaryl group is a fused ring, each ring may include 1 to 3 heteroatoms.

As used herein, when a definition is not otherwise provided, "copolymerization" may refer to a block copolymerization, random copolymerization, graft copolymerization, or alternating copolymerization, and the term "copolymer" may refer to a block copolymer, random copolymer, graft copolymer, or alternating copolymer.

As used herein, (meth)acryl may refer to both of acryl and methacryl.

Binder for Lithium Secondary Battery

Hereinafter, a binder composition for a lithium secondary battery according to an embodiment is described.

A binder composition for a lithium secondary battery according to an embodiment may include, e.g., a copolymer of a first structure unit including amide, a second structural unit including carboxylic acid or a salt thereof, and a third structural unit including a morpholine ring or a thiomorpholine ring.

The first structural unit may be a structural unit of (meth)acrylamide, diacetone(meth)acrylamide, N-methylol (meth)acrylamide, N-isobutoxy(meth)acrylamide, or a combination thereof.

The first structural unit may be included in an amount of about 20 wt % to about 68 wt %, based on a total weight of the copolymer. In an implementation, it may be included in an amount of about 20 wt % to about 60 wt %, e.g., about 30 wt % to about 60 wt %, or about 40 wt % to about 60 wt %.

When the first structural unit is included within the ranges, the binder may be dispersed in slurry smoothly and dispersion of the slurry may be improved.

In an implementation, the first structural unit may be represented by Chemical Formula 1.

[Chemical Formula 1]

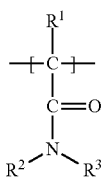

In Chemical Formula 1, $R^1$ to $R^3$ may each independently be, e.g., hydrogen, a substituted or unsubstituted C1 to C10 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, or a substituted or unsubstituted C1 to C30 heteroaryl group. For example, $R^1$ may be hydrogen or a methyl group.

The second structural unit may include carboxylic acid or a salt thereof. In an implementation, the carboxylic acid may be a carboxylic acid monomer or a salt thereof, e.g., (meth) acrylic acid, itaconic acid, fumaric acid, crotonic acid, maleic acid, monomethyl itaconate, methyl fumarate, monobutyl fumarate, and the like which may be used alone or in a mixture of two or more. The salt of the carboxylic acid may be present in a form of a metal salt obtained by releasing hydrogen of acrylic acid and binding with a metal ion. The metal forming a salt with acrylic acid may be an alkali metal, e.g., lithium.

The second structural unit may be included in an amount of about 30 wt % to about 70 wt %, based on a total weight of the copolymer. In an implementation, it may be included in an amount of about 40 wt % to about 70 wt %, e.g., about 40 wt % to about 60 wt %.

When the second structural unit is included within the ranges, a bond between the carboxylic acid or the salt thereof and active materials may be formed to increase interaction between the binder and active materials in an electrode. For example, adherence between the electrode plate and the active material may be increased due to the binder and expansion of the electrode may be improved due to enforcement of adherence to the active material.

In an implementation, the second structural unit may be represented by Chemical Formula 2:

[Chemical Formula 2]

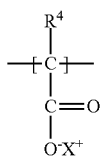

In Chemical Formula 2, $R^4$ may be, e.g., hydrogen, a substituted or unsubstituted C1 to C10 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, or a substituted or unsubstituted C1 to C30 heteroaryl group, and X may be, e.g., hydrogen, deuterium, or an alkali metal.

The third structural unit may include the morpholine ring or the thiomorpholine ring. In an implementation, the third structural unit may include, e.g., a substituted or unsubstituted acryloyl morpholinyl group, a substituted or unsubstituted methacryloyl morpholinyl group, a substituted or unsubstituted acryloyl thiomorpholinyl group, a substituted or unsubstituted methacryloyl thiomorpholinyl group, a substituted or unsubstituted acryloyl 1-oxydo thiomorpholinyl group, a substituted or unsubstituted 1-oxydo methacryloyl thiomorpholinyl group, a substituted or unsubstituted acryloyl 1,1-dioxydo thiomorpholinyl group, a substituted or unsubstituted 1,1-dioxydo methacryloyl thiomorpholinyl group, or a combination thereof.

The third structural unit may be included in an amount of about 2 wt % to about 10 wt %. In an implementation, it may be included in an amount of about 2 wt % to about 9 wt %, for example, about 3 wt % to about 7 wt %, e.g., about 4 wt % to about 6 wt %.

When the third structural unit is included within the ranges, a modulus of the binder may be improved and an expansion ratio of an electrode plate of an electrode may be decreased.

In an implementation, the third structural unit may be represented by Chemical Formula 3.

[Chemical Formula 3]

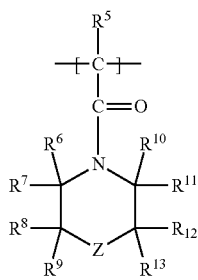

In Chemical Formula 3, $R^5$ to $R^{13}$ may each independently be, e.g., hydrogen, a substituted or unsubstituted C1 to C10 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, or a substituted or unsubstituted C1 to C30 heteroaryl group, and Z may be, e.g., O, S, S(=O), or S(=O)$_2$.

A weight average molecular weight of the copolymer may be about 400,000 to about 1,000,000. In an implementation, it may be about 500,000 to about 900,000, e.g., about 500,000 to about 800,000. The copolymer may have different viscosity and adherence depending on the molecular weight thereof. When the weight average molecular weight of the copolymer is within the ranges, workability during preparation of electrode slurry, adherence to a current collector, and cycle-life of a battery may be improved.

In an implementation, the binder composition for a lithium secondary battery may further include a cyclic compound (e.g., a compound including a cyclic group).

In an implementation, the cyclic compound may include, e.g., a cellulose compound, chitosan, alginate, or pullulan. In an implementation, the cellulose compound may include, e.g., cellulose acetate, cellulose acetate butyrate, cellulose acetate propionate, cyanoethyl cellulose, carboxymethyl cellulose, salts thereof, or a combination thereof.

In an implementation, the cyclic compound and the copolymer may be included in a weight ratio of about 1:9 to about 5:5, e.g., about 2:8 to about 5:5, about 3:7 to about 5:5, or about 4:6 to about 5:5. Within the weight ratios, an expansion ratio of an electrode plate may be decreased.

A pH of the binder composition for a lithium secondary battery may be about 6.0 to about 11.5. In an implementation, the pH of the binder composition for a lithium secondary battery may be about 6.0 to about 9.5, e.g., about 6.0 to about 8.5. When the pH of the binder composition for a lithium secondary battery is within the ranges, a damage of a battery by strong acid or strong base may be prevented and thus a cycle-life of a battery may be improved.

Electrode for Lithium Secondary Battery

In another embodiment, a lithium secondary battery may include an electrode (prepared using the binder composition for a lithium secondary battery and an electrode active material), a separator, and an electrolyte.

The FIGURE illustrates a schematic view showing a lithium secondary battery according to an embodiment. Referring to FIG. 1, the lithium secondary battery 100 may include a battery case 120 including a negative electrode 112, a positive electrode 114, and an electrolytic solution impregnating a separator 113 between the positive electrode 114 and the negative electrode 112, and a sealing member 140 sealing the battery case 120.

The electrode according to an embodiment may be the positive electrode 114 or the negative electrode 112. When the electrode is the negative electrode 112, excellent effects may be expected and may be applied to the negative electrode 112.

For example, when the electrode is the negative electrode 112, the electrode active material may include a silicon compound (e.g., Si, $SiO_x$ where $0<x\le2$, a Si—C composite, a silicon-containing alloy, or a combination thereof), a carbon compound, or a combination thereof.

In an implementation, the silicon compound may be included in an amount of about 5 wt % to about 50 wt %, based on a total weight of the electrode active material. In an implementation, it may be included in an amount of about 5 wt % to about 40 wt %, e.g., about 10 wt % to about 40 wt %, about 10 wt % to about 35 wt %, or about 15 wt % to about 35 wt %.

In an implementation, when the silicon compound is included in an amount of about 55 wt % or more, expansion may still be prevented due to the binder composition for a lithium secondary battery and thus a cycle-life of a lithium secondary battery may be improved.

In an implementation, the carbon compound may include crystalline carbon, amorphous carbon, or a mixture thereof. Examples of the crystalline carbon may include graphite such as non-shaped, sheet, flake, spherical, or fiber-shaped natural graphite or artificial graphite and examples of the amorphous carbon may include soft carbon or hard carbon, a mesophase pitch carbonized product, fired coke, and the like.

In an implementation, the carbon compound may be included in an amount of about 50 wt % to about 95 wt %, e.g., about 60 wt % to about 95 wt %, about 60 wt % to about 90 wt %, about 65 wt % to about 90 wt %, or about 65 wt % to about 85 wt %, based on a total weight of the electrode active material.

When the carbon compound is included within the ranges, lithium ions may be intercalated/deintercalated smoothly and reversibly and thus performance of a lithium secondary battery may be improved.

As described above, when the electrode is used as the negative electrode 112, the positive electrode 114 may include a compound (lithiated intercalation compound) capable of intercalating and deintercallating lithium as a positive active material.

In an implementation, the positive active material include a composite oxide of lithium and at least one metal of cobalt, manganese, nickel, or a combination thereof and examples thereof may be compounds represented by one of the following chemical formulae. $Li_aA_{1-b}R_bD_2$ (wherein, in the chemical formula, $0.90\le a\le1.8$ and $0\le b\le0.5$); $Li_aE_{1-b}R_bO_{2-c}D_c$ (wherein, in the chemical formula, $0.90\le a\le1.8$, $0\le b\le0.5$ and $0\le c\le0.05$); $LiE_{2-b}R_bO_{4-c}D_c$ (wherein, in the chemical formula, $0\le b\le0.5$, $0\le c\le0.05$); $Li_aNi_{1-b-c}Co_bR_cD_c$, (wherein, in the chemical formula, $0.90\le a\le1.8$, $0\le b\le0.5$, $0\le c\le0.05$ and $0\le\alpha\le2$); $Li_aNi_{1-b-c}Co_bR_cO_{2-\alpha}Z_\alpha$ (wherein, in the chemical formula, $0.90\le a\le1.8$, $0\le b\le0.5$, $0\le c\le0.05$ and $0\le\alpha\le2$); $Li_aNi_{1-b-c}Co_bR_cO_{2-\alpha}Z_2$ (wherein, in the chemical formula, $0.90\le a\le1.8$, $0\le b\le0.5$, $0\le c\le0.05$ and $0\le\alpha\le2$); $Li_aNi_{1-b-c}Mn_bR_cD_\alpha$, (wherein, in the chemical formula, $0.90\le a\le1.8$, $0\le b\le0.5$, $0\le c\le0.05$ and $0\le\alpha\le2$); $Li_aNi_{1-b-c}Mn_bR_cO_{2-\alpha}Z_\alpha$ (wherein, in the chemical formula, $0.90\le a\le1.8$, $0\le b\le0.5$, $0\le c\le0.05$ and $0\le\alpha\le2$); $Li_aNi_{1-b-c}Mn_bR_cO_{2-\alpha}Z_2$ (wherein, in the chemical formula, $0.90\le a\le1.8$, $0\le b\le0.5$, $0\le c\le0.05$ and $0\le\alpha\le2$); $Li_aNi_bE_cG_dO_2$ (wherein, in the chemical formula, $0.90\le a\le1.8$, $0\le b\le0.9$, $0\le c\le0.5$ and $0.001\le d\le0.1$); $Li_aNi_bCo_cMn_dGeO_2$ (wherein, in the chemical formula, $0.90\le a\le1.8$, $0\le b\le0.9$, $0\le c\le0.5$, $0\le d\le0.5$ and $0.001\le e\le0.1$); $Li_aNiG_bO_2$ (wherein, in the chemical formula, $0.90\le a\le1.8$ and $0.001\le b\le0.1$); $Li_aCoG_bO_2$ (wherein, in the chemical formula, $0.90\le a\le1.8$ and $0.001\le b\le0.1$); $Li_aMnG_bO_2$ (wherein, in the chemical formula, $0.90\le a\le1.8$ and $0.001\le b\le0.1$); $Li_aMn_2G_bO_4$ (wherein, in the chemical formula, $0.90\le a\le1.8$ and $0.001\le b\le0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0\le f\le2$); $Li_{(3-f)}Fe_2(PO_4)_3$ ($0\le f\le2$); and $LiFePO_4$.

In the chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

In an implementation, the positive electrode 112 may further include a binder or a conductive material.

In an implementation, the binder may be the same as the binder according to an embodiment described above, or may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material may be included to provide electrode conductivity. A suitable electrically conductive material that does not cause a chemical change may be used. Examples of the conductive material may include a carbon material such as natural graphite, artificial graphite, carbon black, acetylene black, ketjen black, a carbon fiber, and the like; a metal material of a metal powder or a metal fiber including copper, nickel, aluminum, silver, and the like; a conductive polymer such as a polyphenylene derivative, and the like; or a mixture thereof.

In an implementation, an amount of the conductive material may be about 0.1 to about 50 parts by weight, e.g., about 0.1 to about 30 parts by weight, about 0.1 to about 15 parts by weight, or about 0.1 to about 10 parts by weight based on 100 parts by weight of the electrode composition.

The negative electrode 114 and the positive electrode 112 may be manufactured by mixing each active material, a binder, and a conductive material in a solvent to prepare an electrode composition and coating the electrode composition on a current collector.

The current collector may be a suitable current collector for a battery and may have conductivity. In an implementation, the current collector may have a thickness of, e.g., about 3 μm to about 500 μm.

When the current collector is applied to a negative electrode, it may be a copper foil, a nickel foil, a stainless steel foil, a titanium foil, a nickel foam, a copper foam, a polymer substrate coated with a conductive metal, or a combination thereof.

When the current collector is applied to a positive electrode, it may be stainless steel, aluminum, nickel, titanium, fired carbon, or aluminum or stainless steel of which the surface is treated with carbon, nickel, titanium, or silver.

The electrode may be manufactured according to a suitable method.

The separator 113 may separate the negative electrode 114 from the positive electrode 112 and may provide a transporting passage for lithium ions and may be any generally-used separator for a lithium battery. The separator 113 may have a low resistance to transportation of electrolyte ions and an excellent impregnation for an electrolytic solution.

In an implementation, the separator 113 may include a glass fiber, polyester, polyethylene, polypropylene, polytetrafluoroethylene (PTFE), or a combination thereof, and may have a form of a non-woven fabric or a woven fabric. For example, a polyolefin-based polymer separator such as polyethylene, polypropylene, and the like is mainly used for a lithium ion battery. In order to help ensure the heat resistance or a mechanical strength, a separator coated with a ceramic component or a polymer material may be used. Optionally, it may have a mono-layered or multi-layered structure.

The electrolyte may include a non-aqueous organic solvent and a lithium salt.

The non-aqueous organic solvent serves as a medium for transmitting ions taking part in the electrochemical reaction of a battery. The non-aqueous organic solvent may be used alone or in a mixture. When the organic solvent is used in a mixture, the mixture ratio may be controlled in accordance with a desirable battery performance.

The lithium salt may be dissolved in a non-aqueous organic solvent, may supply lithium ions in a battery, may operate a basic operation of the lithium secondary battery, and may promote transportation of the lithium ions between positive and negative electrodes. Examples of the lithium salt may include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, $LiB(C_2O_4)_2$ (lithium bis(oxalato) borate; LiBOB), or a combination thereof. A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

Hereinbefore, the binder composition for a lithium secondary battery according to an embodiment and a lithium secondary battery including the binder composition for a lithium secondary battery according to another embodiment are explained. Accordingly, provided are the binder composition for a lithium secondary battery, capable of controlling the expansion of the active material effectively, maintaining paths of lithium ions, improving capacity of a battery, and having stability with an electrolytic solution due to decreased side reaction, and a lithium secondary battery including the same.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparation of Binder

Synthesis Example 1

280 g of deionized water and 20 g of sodium carboxymethyl cellulose (weight average molecular weight=250,000 g/mol) were put in a 2 L reaction vessel equipped with a heater, a cooler, and an agitator, and the reaction vessel was heated up to 80° C. under a nitrogen atmosphere and maintained for 2 hours. Subsequently, a solution prepared by dissolving 0.2 g of ammonium persulfate in 20 g of deionized water was added thereto, the mixture was maintained for 20 minutes, and a mixed aqueous solution prepared by dissolving 84 g of acrylamide, 84 g of acrylic acid, and 12 g of acryloyl morpholine in 256 g of deionized water was added thereto in a dropwise fashion for 3 hours. Subsequently, the obtained mixture was maintained and reacted for 1 hour and cooled down to less than or equal to 40° C., an aqueous solution prepared by dissolving 21 g of lithium hydroxide in 380 g of deionized water was added thereto in a dropwise fashion over 10 minutes, and the obtained mixture was maintained for 30 minutes to prepare a copolymer including structural units of Chemical Formulae 1-1, 2-1, and 3-1.

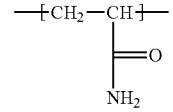

[Chemical Formula 1-1]

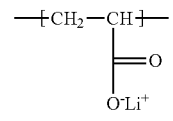

[Chemical Formula 2-1]

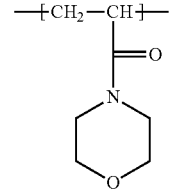

[Chemical Formula 3-1]

Synthesis Example 2

280 g of deionized water and 20 g of sodium carboxymethyl cellulose (weight average molecular weight=250,000 g/mol) were put in a 2 L reaction vessel equipped with a heater, a cooler, and an agitator, and the reaction vessel was heated up to 80° C. under a nitrogen atmosphere and maintained for 2 hours. Subsequently, a solution prepared by dissolving 0.2 g of ammonium persulfate in 20 g of deionized water was added thereto, the obtained mixture was maintained for 20 minutes, and a mixed aqueous solution prepared by dissolving 87 g of acrylamide, 87 g of acrylic acid, and 6 g of acryloyl morpholine in 256 g of deionized water was added thereto in a dropwise fashion for 3 hours. Subsequently, the obtained mixture was maintained and reacted for 1 hour, cooled down to less than or equal to 40° C. an aqueous solution prepared by dissolving 21 g of lithium hydroxide in 380 g of deionized water was added thereto in a dropwise fashion over 10 minutes, and the obtained mixture was maintained for 30 minutes to prepare a copolymer including structural units of Chemical Formulae 1-1, 2-1, and 3-1.

Synthesis Example 3

280 g of deionized water and 20 g of sodium carboxymethyl cellulose (weight average molecular weight=250,000 g/mol) were put in a 2 L reaction vessel equipped with a heater, a cooler, and an agitator, and the reaction vessel was heated up to 80° C. under a nitrogen atmosphere and maintained for 2 hours. Subsequently, a solution prepared by dissolving 0.2 g of ammonium persulfate in 20 g of deionized water was added thereto, the obtained mixture was maintained for 20 minutes, and a mixed aqueous solution prepared by dissolving 81 g of acrylamide, 81 g of acrylic acid, and 18 g of acryloyl morpholine in 256 g of deionized water was added thereto in a dropwise fashion for 3 hours. Subsequently, the obtained mixture was maintained and reacted for 1 hour, cooled down to less than or equal to 40° C., an aqueous solution prepared by dissolving 20 g of lithium hydroxide in 380 g of deionized water was added thereto over 10 minutes, and the obtained mixture was maintained for 30 minutes to prepare a copolymer including structural units of Chemical Formulae 1-1, 2-1, and 3-1.

Synthesis Example 4

280 g of deionized water and 40 g of sodium carboxymethyl cellulose (weight average molecular weight=250,000 g/mol) were put in a 2 L reaction vessel equipped with a heater, a cooler, and an agitator, and the reaction vessel was heated up to 80° C. under a nitrogen atmosphere and maintained for 2 hours. Subsequently, a solution prepared by dissolving 0.2 g of ammonium persulfate in 20 g of deionized water was added thereto, the obtained mixture was maintained for 20 minutes, and a mixed aqueous solution prepared by dissolving 74 g of acrylamide, 74 g of acrylic acid, and 12 g of acryloyl morpholine in 256 g of deionized water was added thereto in a dropwise fashion for 3 hours. Subsequently, the obtained mixture was maintained and reacted for 1 hour, cooled down to less than or equal to 40° C., an aqueous solution prepared by dissolving 18.5 g of lithium hydroxide in 380 g of deionized water was added thereto over 10 minutes, and the obtained mixture was maintained for 30 minutes to prepare a copolymer including structural units of Chemical Formulae 1-1, 2-1, and 3-1.

Synthesis Example 5

280 g of deionized water and 20 g of sodium carboxymethyl cellulose (weight average molecular weight=250,000 g/mol) were put in a 2 L reaction vessel equipped with a heater, a cooler, and an agitator, and the reaction vessel was heated up to 80° C. under a nitrogen atmosphere and maintained for 2 hours. Subsequently, a solution prepared by dissolving 0.2 g of ammonium persulfate in 20 g of deionized water was added thereto, the obtained mixture was maintained for 20 minutes, and a mixed aqueous solution prepared by dissolving 88 g of acrylamide, 88 g of acrylic acid, and 4 g of acryloyl morpholine in 256 g of deionized water was added thereto in a dropwise fashion for 3 hours. Subsequently, the obtained mixture was maintained and reacted for 1 hour, cooled down to less than or equal to 40° C., an aqueous solution prepared by dissolving 22 g of lithium hydroxide in 380 g of deionized water was added thereto over 10 minutes, and the obtained mixture was maintained for 30 minutes to prepare a copolymer including structural units of Chemical Formulae 1-1, 2-1, and 3-1.

Synthesis Example 6

280 g of deionized water and 5 g of sodium carboxymethyl cellulose (weight average molecular weight=250,000 g/mol) were put in a 2 L reaction vessel equipped with a heater, a cooler, and an agitator, and the reaction vessel was heated up to 80° C. under a nitrogen atmosphere and maintained for 2 hours. Subsequently, a solution prepared by dissolving 0.2 g of ammonium persulfate in 20 g of deionized water was added thereto, the obtained mixture was maintained for 20 minutes, and a mixed aqueous solution prepared by dissolving 91.5 g of acrylamide, 91.5 g of acrylic acid, and 12 g of acryloyl morpholine in 256 g of deionized water was added thereto in a dropwise fashion for 3 hours. Subsequently, the obtained mixture was maintained and reacted for 1 hour, cooled down to less than or equal to 40° C., an aqueous solution prepared by dissolving 23 g of lithium hydroxide in 380 g of deionized water was added thereto over 10 minutes, and the obtained mixture was maintained for 30 minutes to prepare a copolymer including structural units of Chemical Formulae 1-1, 2-1, and 3-1.

Comparative Synthesis Example 1

280 g of deionized water and 20 g of sodium carboxymethyl cellulose (weight average molecular weight=250,000 g/mol) were put in a 2 L reaction vessel equipped with a heater, a cooler, and an agitator, and the reaction vessel was heated up to 80° C. under a nitrogen atmosphere and maintained for 2 hours. Subsequently, a solution prepared by dissolving 0.2 g of ammonium persulfate in 20 g of deionized water was added thereto, the obtained mixture was maintained for 20 minutes, and a mixed aqueous solution prepared by dissolving 80 g of acrylamide and 80 g of acrylic acid in 256 g of deionized water was added thereto in a dropwise fashion for 3 hours. Subsequently, the obtained mixture was maintained and reacted for 1 hour, cooled down to less than or equal to 40° C., an aqueous solution prepared by dissolving 21 g of lithium hydroxide in 380 g of deionized water was added thereto over 10 minutes, and the obtained mixture was maintained for 30 minutes to prepare a copolymer including structural units of Chemical Formulae 1-1 and 2-1. Comparative Synthesis Example 2

280 g of deionized water and 20 g of sodium carboxymethyl cellulose (weight average molecular weight=250,000 g/mol) were put in a 2 L reaction vessel equipped with a heater, a cooler, and an agitator, and the reaction vessel was heated up to 80° C. under a nitrogen atmosphere and maintained for 2 hours. Subsequently, a solution prepared by dissolving 0.2 g of ammonium persulfate in 20 g of deionized water was added thereto, the obtained mixture was maintained for 20 minutes, and a mixed aqueous solution prepared by dissolving 80 g of acrylamide, 80 g of acrylic acid, and 20 g of acryloyl morpholine in 256 g of deionized water was added thereto in a dropwise fashion for 3 hours. Subsequently, the obtained mixture was maintained and reacted for 1 hour, cooled down to less than or equal to 40° C., an aqueous solution prepared by dissolving 20 g of lithium hydroxide in 380 g of deionized water was added thereto over 10 minutes, and the obtained mixture was maintained for 30 minutes to prepare a copolymer including structural units of Chemical Formulae 1-1, 2-1, and 3-1.

Manufacture of Lithium Secondary Battery

Example 1

Slurry for a negative active material layer was prepared by adding 58.5 wt % of a silicon compound (a Si—Ti—Ni alloy, MK Electron Co., Ltd.), 22.0 wt % of first graphite (MC20, Mitsubishi Chemical Corp.), 9.5 wt % of second graphite (Timrex SFG6, Timcal Ltd.), 2 wt % of ketjen black (KB603, LION Company), and 8 wt % of the binder composition of Synthesis Example 1 to water. The slurry was coated on copper foil and then, dried and compressed to manufacture a negative electrode. Herein, the negative electrode was coated with a loading level of 5.5 mg/cm$^2$ and had active mass density of 1.5 g/cc. A counter electrode of the negative electrode was a lithium metal having a thickness of 100 μm. An electrolyte was prepared by mixing ethylene carbonate (EC), diethyl carbonate (DEC), and fluoroethylene carbonate (FEC) in a volume ratio of 5:70:25 and adding 1.5 M of LiPF$_6$ thereto. The negative electrode, the counter electrode, and the electrolyte were used to manufacture a half-cell.

Example 2

A half-cell was manufactured according to the same method as Example 1 by using the binder of Synthesis Example 2.

Example 3

A half-cell was manufactured according to the same method as Example 1 by using the binder of Synthesis Example 3.

Example 4

A half-cell was manufactured according to the same method as Example 1 by using the binder of Synthesis Example 4.

Example 5

A half-cell was manufactured according to the same method as Example 1 by using the binder of Synthesis Example 5.

Example 6

A half-cell was manufactured according to the same method as Example 1 by using the binder of Synthesis Example 6.

Comparative Example 1

A half-cell was manufactured according to the same method as Example 1 by using the binder of Comparative Synthesis Example 1.

Comparative Example 2

A half-cell was manufactured according to the same method as Example 1 by using the binder of Comparative Synthesis Example 2.

Experimental Examples

Swelling Ratio Evaluation Method

The binders according to Synthesis Examples 1 to 6 and Comparative Synthesis Examples 1 and 2 were respectively dried at 80° C. and formed into each film. The films were dipped in an electrolytic solution (EC:DEC:FEC=5:70:25) and stored at 60° C. for 72 hours, and their weights after swelling were measured. Their swelling ratios were calculated as follows: (film weight before swelling−film weight after swelling)/film weight before swelling*100.

Evaluation of Electrode Expansion Ratio

An electrode expansion ratio of the half-cells Examples 1 to 6 and Comparative Examples 1 and 2 was evaluated in the following method.

The electrode expansion ratio was calculated as follows: (electrode plate thickness after charge at 0.1 C−electrode plate thickness before charge)/electrode plate thickness before charge*100.

Measuring Method of Cycle-life at High Temperature

A cycle-life at a high temperature was evaluated by once 0.1 C charging/discharging the cells, once 0.2 C charging/discharging them, then, repeating the 1 C charge/discharge at 45° C., and calculating a maintenance rate of 100$^{th}$ discharge capacity based on 100% of the first discharge capacity at 1 C.

The evaluation results of the swelling ratio, the electrode expansion ratio, and the cycle-life at a high temperature are shown in Table 1.

TABLE 1

|  | Binder composition (AA:AA2:AM) | Binder composition (wt %) | CMC is included or not | Swelling ratio (%) | Expansion ratio (%) | Cycle-life at high temperature (%) |
| --- | --- | --- | --- | --- | --- | --- |
| Example 1 | 84:84:12 | 46.7:46.7:6.6 | ∘ | 5 | 33 | 91 |
| Example 2 | 87:87:6 | 48.3:48.3:3.3 | ∘ | 10 | 40 | 85 |
| Example 3 | 81:81:18 | 45:45:10 | ∘ | 12 | 39 | 87 |
| Example 4 | 74:74:12 | 46.25:46.25:7.5 | ∘ | 10 | 42 | 89 |
| Example 5 | 88:88:4 | 48.9:48.9:2.2 | ∘ | 12 | 42 | 84 |
| Example 6 | 91.5:91.5:12 | 46.9:46.9:6.2 | ∘ | 10 | 38 | 86 |
| Comparative Example 1 | 80:80:0 | 50:50:0 | ∘ | 12 | 40 | 70 |

TABLE 1-continued

|  | Binder composition (AA:AA2:AM) | Binder composition (wt %) | CMC is included or not | Swelling ratio (%) | Expansion ratio (%) | Cycle-life at high temperature (%) |
|---|---|---|---|---|---|---|
| Comparative Example 2 | 80:80:20 | 44.4:44.4:22.2 | o | 14 | 41 | 75 |

In Table 1, AA denotes acrylamide, AA2 denotes acrylic acid, AM denotes acryloyl morpholine, and CMC denotes carboxymethyl cellulose. "o" denotes "CMC is included". The composition ratio was a weight ratio. Referring to Table 1, the lithium secondary battery cells according to Examples 1 to 6 showed an improved cycle-life at a high temperature as well as maintained a swelling ratio and an expansion ratio, compared with the lithium secondary battery cells according to Comparative Examples 1 and 2.

By way of summation and review, a Si negative active material may have very high charge capacity and may be widely applied to a high-capacity battery. The Si negative active material may expand about 300 to about 400% during charge and discharge, and charge and discharge characteristics and cycle-life characteristics of batteries may be deteriorated.

A binder capable of effectively controlling expansion of the Si negative active material may be considered. For example, a binder composition capable of effectively controlling expansion of the active material may be developed.

One or more embodiments may provide a binder composition for a lithium secondary battery capable of controlling expansion of an active material, and maintaining paths of lithium ions, and improving battery capacity, and having improved stability with an electrolytic solution due to a decreased side reaction, a lithium secondary battery having improved initial efficiency, charge and discharge characteristics, cycle-life characteristics due to the binder composition.

The binder composition for a lithium secondary battery according to an embodiment may help control expansion of an active material effectively, may help maintain paths of lithium ions to improve battery capacity, and may have improved stability with an electrolytic solution due to a decreased side reaction.

The lithium secondary battery according to another embodiment may have improved initial efficiency, charge and discharge characteristics, and cycle-life characteristics.

DESCRIPTION OF SYMBOLS

100: lithium secondary battery
112: negative electrode
113: separator
114: positive electrode
120: battery case
140: sealing member Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Accordingly, it will be understood by those of skill in the art that various changes in form and details may be made without departing from the spirit and scope of the present invention as set forth in the following claims.

What is claimed is:

1. A binder composition for a lithium secondary battery, the binder composition comprising a copolymer that includes:
   a first structural unit including an amide,
   a second structural unit including a carboxylic acid or a salt thereof, and
   a third structural unit including a morpholine ring or a thiomorpholine ring
   wherein a weight average molecular weight of the copolymer is about 400,000 to about 1,000,000.

2. The binder composition as claimed in claim 1, wherein the first structural unit is represented by Chemical Formula 1:

[Chemical Formula 1]

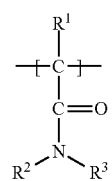

wherein, in Chemical Formula 1,
$R^1$ to $R^3$ are each independently hydrogen, a substituted or unsubstituted C1 to C10 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, or a substituted or unsubstituted C1 to C30 heteroaryl group.

3. The binder composition as claimed in claim 1, wherein the second structural unit is represented by Chemical Formula 2:

[Chemical Formula 2]

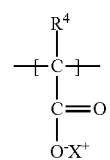

wherein, in Chemical Formula 2,
$R^4$ is hydrogen, a substituted or unsubstituted C1 to C10 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, or a substituted or unsubstituted C1 to C30 heteroaryl group, and X is hydrogen, deuterium, or an alkali metal.

4. The binder composition as claimed in claim 1, wherein the third structural unit is represented by Chemical Formula 3:

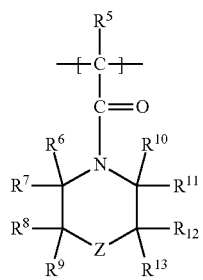

[Chemical Formula 3]

wherein, in Chemical Formula 3, $R^5$ to $R^{13}$ are each independently hydrogen, a substituted or unsubstituted C1 to C10 alkyl group, a substituted or unsubstituted C2 to C10 alkenyl group, a substituted or unsubstituted C2 to C10 alkynyl group, a substituted or unsubstituted C1 to C10 alkoxy group, a substituted or unsubstituted C3 to C10 cycloalkyl group, a substituted or unsubstituted C6 to C30 aryl group, or a substituted or unsubstituted C1 to C30 heteroaryl group, and Z is O, S, S(=O), or S(=O)$_2$.

5. The binder composition as claimed in claim 1, wherein the copolymer includes:

about 20 wt % to about 68 wt % of the first structural unit, about 30 wt % to about 70 wt % of the second structural unit, and about 2 wt % to about 10 wt % of the third structural unit, all wt % being based on a total weight of the copolymer.

6. The binder composition as claimed in claim 1, further comprising a cyclic compound.

7. The binder composition as claimed in claim 6, wherein the cyclic compound includes a cellulose compound, chitosan, alginate, or pullulan.

8. The binder composition as claimed in claim 6, wherein a weight ratio of the copolymer to the cyclic compound is about 1:9 to about 5:5.

9. The binder composition as claimed in claim 1, wherein a pH of the binder composition is about 6.0 to about 11.5.

10. A lithium secondary battery, comprising:
an electrode that includes a binder composition and an electrode active material;
a separator; and
an electrolyte,
wherein the binder composition includes a copolymer that includes:
a first structural unit including an amide,
a second structural unit including a carboxylic acid or a salt thereof, and
a third structural unit including a morpholine ring or a thiomorpholine ring.

11. The lithium secondary battery as claimed in claim 10, wherein the electrode active material includes Si, $SiO_x$, in which $0<x\leq2$, a Si—C composite, a Si-containing alloy, a carbon compound, or a combination thereof.

12. The lithium secondary battery as claimed in claim 11, wherein:
the electrode active material includes the Si, $SiO_x$, in which $0<x\leq2$, a Si—C composite, or Si-containing alloy, and
the Si, $SiO_x$ where $0<x\leq2$, Si—C composite, or Si-containing alloy is included in an amount of about 5 wt % to about 50 wt %, based on a total weight of the electrode active material.

13. The lithium secondary battery as claimed in claim 11, wherein:
the electrode active material includes the carbon compound, and
the carbon compound includes crystalline carbon including non-shaped, sheet, flake, spherical, or fiber-shaped natural graphite, artificial graphite, amorphous carbon of soft carbon, hard carbon, a mesophase pitch carbonized product, fired coke, or a combination thereof.

14. The lithium secondary battery as claimed in claim 11, wherein:
the electrode active material includes the carbon compound, and
the carbon compound is included in an amount of about 50 wt % to about 95 wt %, based on a total weight of the electrode active material.

15. A binder composition for a lithium secondary battery, the binder composition comprising a copolymer that includes:
a first structural unit including an amide,
a second structural unit including a carboxylic acid or a salt thereof, and
a third structural unit including a morpholine ring or a thiomorpholine ring,
wherein a pH of the binder composition is about 6.0 to about 11.5.

* * * * *